United States Patent [19]

Vaiana

[11] Patent Number: 4,991,120

[45] Date of Patent: Feb. 5, 1991

[54] APPARATUS FOR INTERFACING VIDEO FRAME STORE WITH COLOR DISPLAY DEVICE

[75] Inventor: Joseph A. Vaiana, Rochester, N.Y.

[73] Assignee: Eastman Kodak Company, Rochester, N.Y.

[21] Appl. No.: 357,831

[22] Filed: May 30, 1989

[51] Int. Cl.⁵ .............................................. G06K 15/00

[52] U.S. Cl. .............................................. 364/521; 358/80

[58] Field of Search .................. 364/521, 518; 358/27, 358/28, 80, 76; 340/703, 704

[56] References Cited

U.S. PATENT DOCUMENTS 4,364,084 12/1982 Akimoto et al. ...................... 358/76

*Primary Examiner*—Arthur G. Evans

*Attorney, Agent, or Firm*—Edward Dugas

[57] ABSTRACT

An interface for controllably reading out color imagery data from a video frame store to a high resolution color monitor, without the need for traversing a communication path through the host computer's signal processing link, includes a programmable color correction mechanism stored in a plurality of look-up table memories, representative of color correction values associated with the primary colors of the video image. When driving the color display with the video image contents of the frame store, the contents of the frame store are read out on a sequential pixel basis and applied as address inputs to the look-up table memories. In response to each frame store imagery data input, each of the look-up tables outputs a color correction code. The three color correction codes that are accessed for each pixel are applied to an analog-digital converter for converting each of the color correction codes into a respective pixel energization signal for controlling the excitation of one of the pixels of the pixel array of the display device, whereby the display device displays the frame store color image in a color-corrected format. The excitation voltage for driving each pixel is derived in accordance with three, eight-bit color correction codes so that the full color range (sixteen million plus color) storge capability of the frame store is utilized.

10 Claims, 4 Drawing Sheets

APPARATUS FOR INTERFACING VIDEO FRAME STORE WITH COLOR DISPLAY DEVICE

FIELD OF THE INVENTION

The present invention relates in general to the processing of color imagery data and is particularly directed to an apparatus for controllably modifying the accessed contents of a digital video frame store to produce high precision color pixel excitation signals for control of the display of the stored image on a color display device.

BACKGROUND OF THE INVENTION

Systems for processing color imagery signals, such as those provided by a high resolution video camera, commonly download digitized imagery signals into a dedicated imagery memory unit, known as a frame store, the contents of which are controllably accessed by a host computer for display on an attendant color display device. Because of the limited data capacity of the signal processing components and associated limited color range of the display device (typically on the order of eight bits per pixel), the original color imagery data output from the camera must be compressed (for example, from an original twenty-four bits per pixel to the eight bits per pixel range of the processor's associated display) in the course of data manipulation (including an color correction or enhancement by the host computer) and display. As a consequence of such compression, however, a significant amount of color information in the original image is lost. Indeed, compression of a twenty-four bits per pixel video image to an eight bit range reduces the color potential of the display image from sixteen million to only two hundred fifty-six. In other words, even though the frame store possesses the full color range of the color imagery representative data, it is accessed through a signal processing mechanism that inherently reduces this color range, so that the color quality of the recreated image is far less than that available from the front end video signal generator.

SUMMARY OF THE INVENTION

In accordance with the present invention the quality reduction characteristics of conventional data processing mechanisms that employ a frame store possessing high capacity color resolution capability are obviated by a frame store interface through which the imagery data may be read out to a high resolution color monitor, without the need for traversing the typical path through the host computer's signal processing communication link. As a consequence, the color range capacity of the imagery data is not detrimentally impacted. In addition, by means of a set of color-dedicated look-up tables, the contents of which are addressed by the imagery data accessed from the frame store, precision enhancement or correction of each of the available colors, of which each pixel in the regenerated image may be comprised, is afforded.

More particularly, the present invention is directed to an apparatus that may be directly interfaced with a digital video data memory in which is stored color video imagery data in the form of a plurality of multibit digital codes, each code being associated with one of a plurality of colors that are used to define the color contents of an array of image components into which a color image has been subdivided. As exemplary parameters, a color video image, such as that derived by a color video camera, may be subdivided into an $(N=1024)\times(N=1024)$ array of image elements. With the imagery representative output signals from the camera being digitized at an encoding width of a $(K=8)$ bits per color, then, for a set of $(J=3)$ primary colors of red, green and blue, the contents of the frame store are capable of driving a $1024\times1024$ pixel array color display with a color range of 24 bits per pixel, so that any pixel of the display may regenerate any of the sixteen million plus colors of which the original video image is comprised.

The direct interfacing of the contents of the frame store with the color display is effected through a programmable color correction mechanism comprised of a plurality of look-up table memories, each of which is stores a plurality $2^K$ of K-bit, color correction codes representative of color correction values associated with one of the primary colors used to define the colors of the video image. In the course of driving the color display with the video image contents of the frame store, the contents of the frame store are read out on a sequential pixel basis and applied as address inputs to the look-up table memories. In response to each frame store imagery data input, each of the look-up tables outputs a color correction code. The three color correction codes that are accessed for each pixel are applied to an analog-digital converter for converting each of the color correction codes into a respective pixel energization signal for controlling the excitation of one of the pixels of the pixel array of the display device, whereby the display device displays the frame store color image in a color-corrected format.

In addition to its color display interface capability, the present invention may interface the contents of the frame store with a monochromatic display. For this purpose, the look-up table memories for red and blue are bypassed and the multibit codes for only one of the colors (e.g. green) are applied to each of the three color input links of the analog-digital converter for driving the display monochromatically.

In the course of programming the look-up table memories, the interface apparatus operates asynchronously at a first, relatively low clock rate for writing respective ones of the color correction codes into the look-up table memories. During read-out mode, the look-up table memories are successively addressed at a second clock rate, faster than the first clock rate, in synchronism with the interlace scanning signals of the display, so as to produce a total of JxNxM, color correction codes through which excitation signals for the NxM array pixels of the display device are produced. Since the excitation voltage for driving each pixel is derived in accordance with three, eight bit color correction codes, the full color range (sixteen million plus colors) storage capability of the frame store is utilized.

DETAILED DESCRIPTION

Figure 1:
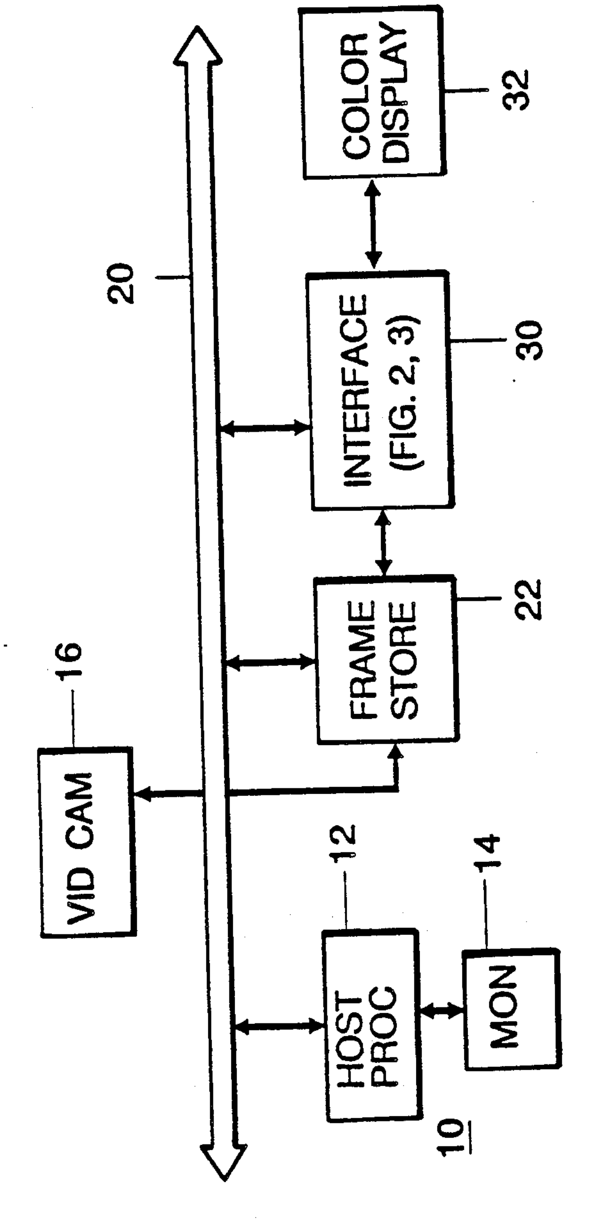
FIG. 1 diagrammatically illustrates the general architecture of a distributed digital signal processing system having a color video camera and frame store coupled to the system communication bus.

Before describing in detail the particular improved color video image frame store interface apparatus in accordance with the present invention, it should be observed that the present invention resides primarily in a novel structural combination of conventional communication circuits and components and not in the particular detailed configurations thereof. Accordingly the structure control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

FIG. 1 diagrammatically illustrates the general architecture of a distributed digital signal processing system 10, including a host processor 12 and attendant color monitor 14, in which a source of imagery data, such as a color video camera 16, is coupled as an input device to a system communication bus 20. As a frame of imagery data is output from camera 16, it is coupled to a frame store 22. Once captured by the frame store the data may be accessed by host processor 12 for processing and display via monitor 14. As pointed out previously, the typical width of the processor data path and its associated terminal display 14 is on the order of eight bits, while the color range (and corresponding encoding capacity) of the imagery data from camera 16 is considerably greater (e.g. $3\times8=24$ bits per pixel of the imagery data from source 16 as stored in frame store 22 vs. eight bits per pixel of monitor 14). As a result, when the data is accessed from frame store 22 via host computer 12 for processing and display on monitor 14, it is initially compressed (from twenty-four bits per pixel to eight bits per pixel), so that it suffers a dramatic reduction in color range. Pursuant to the present invention, the basic signal processing functionality of this data processing architecture is augmented by means of a video signal interface 30 that is adapted to be coupled directly between the frame store 22 and a high resolution (e.g. $1024\times1024$) color monitor 32, in order that the high quality characteristics of the color imagery data that has been downloaded in to frame store 22 can be faithfully reproduced, without a loss in color quality.

As will be described in detail below with reference to FIGS. 2–4, interface 30 contains a programmable color correction mechanism comprised of a plurality of look-up table memories, each of which stores a plurality of color correction codes representative of color correction values associated with one of the primary colors used to define the colors of the video image within frame store 22. In order to drive high resolution color display 32 with the video image contents of the frame store, the contents of frame store 22 are read out on a sequential pixel basis and applied as address inputs to the look-up table memories. In response to each frame store imagery data input, each of the look-up tables outputs a color correction code. The three color correction codes that are accessed for each pixel are applied to an analog-digital converter for converting each of the color correction codes into a respective pixel energization signal for controlling the excitation of one of the pixels of the pixel array of the display device, whereby the display device displays the frame store color image in a color-corrected format. Since the excitation voltage for driving each pixel of the display is derived in accordance with three, eight bit color correction codes, the full color range (sixteen million plus colors) storage capability of the frame store is utilized.

Figure 2:
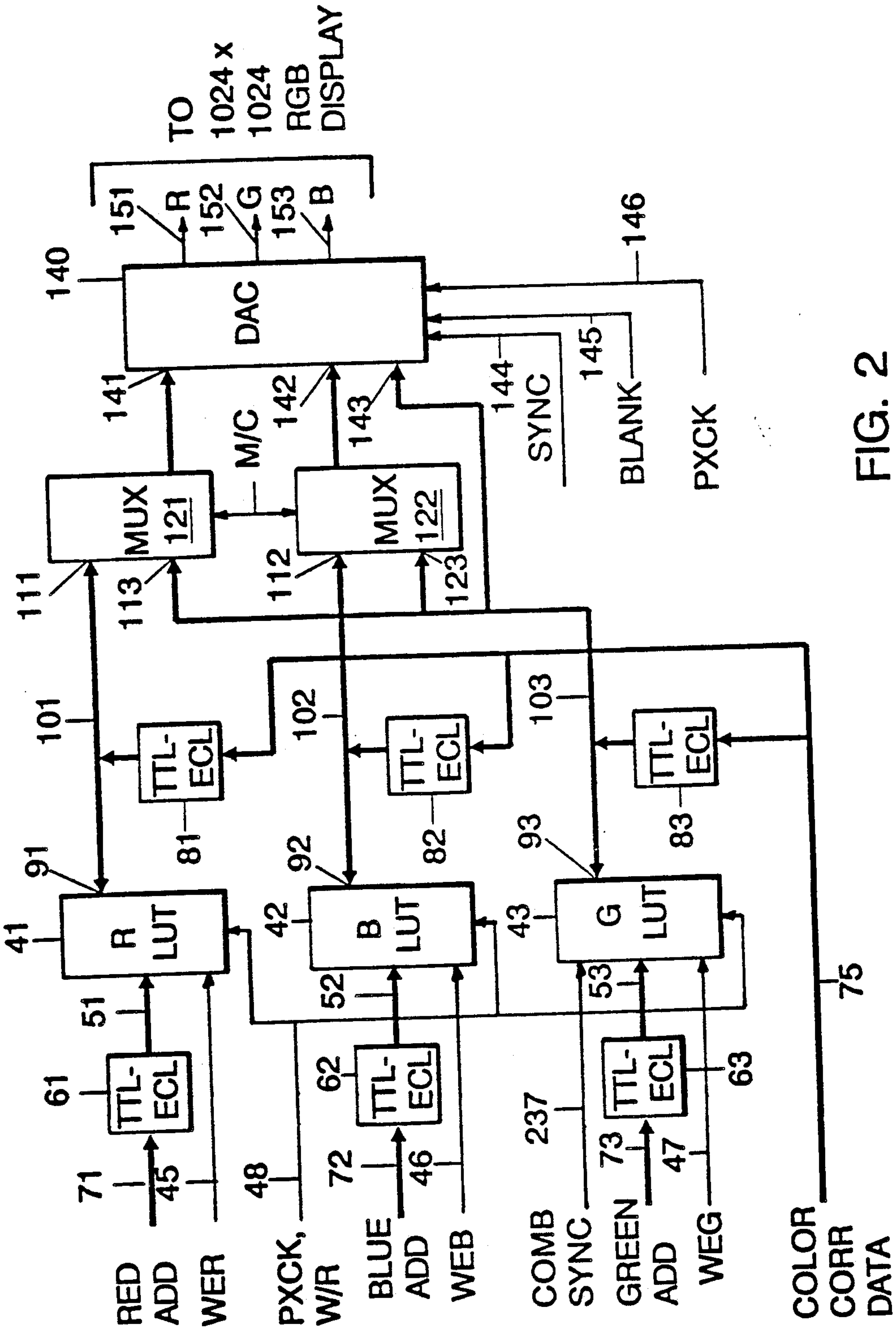
FIG. 2 diagrammatically illustrates the color correction code storage and conversion components of the interface in accordance with the present invention.

Referring now to FIG. 2, the color correction code storage and conversion components of interface 30 are diagrammatically illustrated as comprising a set of look-up table (random access) memories 41, 42 and 43, that are coupled to the data bus of the frame store. For purposes of the present description frame store 22 will be assumed to employ a data bus architecture that accomodates a four byte width. For the exemplary parameters given above, each memory may have $256\times8$ storage capacity. Three respective $K=8$ bit address input links 51, 52 and 53 of the memories are coupled through (TTL-ECL) signal level conversion circuits 61, 62 and 63 to respective (red, blue and green-representative) video data links 71, 72 and 73 of frame store 22. A fourth eight bit data link 75 of the frame store data bus is coupled through respective (TTL-ECL) signal level conversion 81, 82 and 83 to the data ports 91, 92 and 93 of memories 41, 42 and 43. The programming and reading out of the contents of the look-up table memories are controlled by means of control links 45, 46, 47 and 48 that supply timing and enabling signals from the timing and control logic of FIG. 3, to be described below.

The data ports 91 of 'red' and 'blue' look-up table memories 41 and 42, respectively, are coupled via data bus links 101 and 102 to first inputs 111 and 112 of multiplexers 121 and 122. The data port 93 of 'green' look-up table memory 43 is coupled via data bus link 103 to second inputs 113 and 123 of respective multiplexers 121 and 122 and to the 'green' input port 143 of a digital-analog converter 140. The output of multiplexer 121 is coupled to the 'red' input port 141 of digital-analog converter 140, while the output of multiplexer 122 is coupled to its 'blue' input port 142. The analog output (e.g. R.S.343A compatible) ports 151, 152 and 153 of multiplexer 140 provide pixel energization analog voltages for the respective red, blue and green video inputs of color display device 32. (When driving a monochromatic (green) display, the red and blue output ports 151 and 152 are terminated in 75 ohm resistors.) Digital-analog converter 140 also has separate inputs 144 and 145 for sync and blank signals which it employs to generate blanking signals on all three colors (RGB) and sync on green. A sixth input 146 is coupled to receive clock signals from the timing and control circuitry of FIG. 3.

Figure 3:
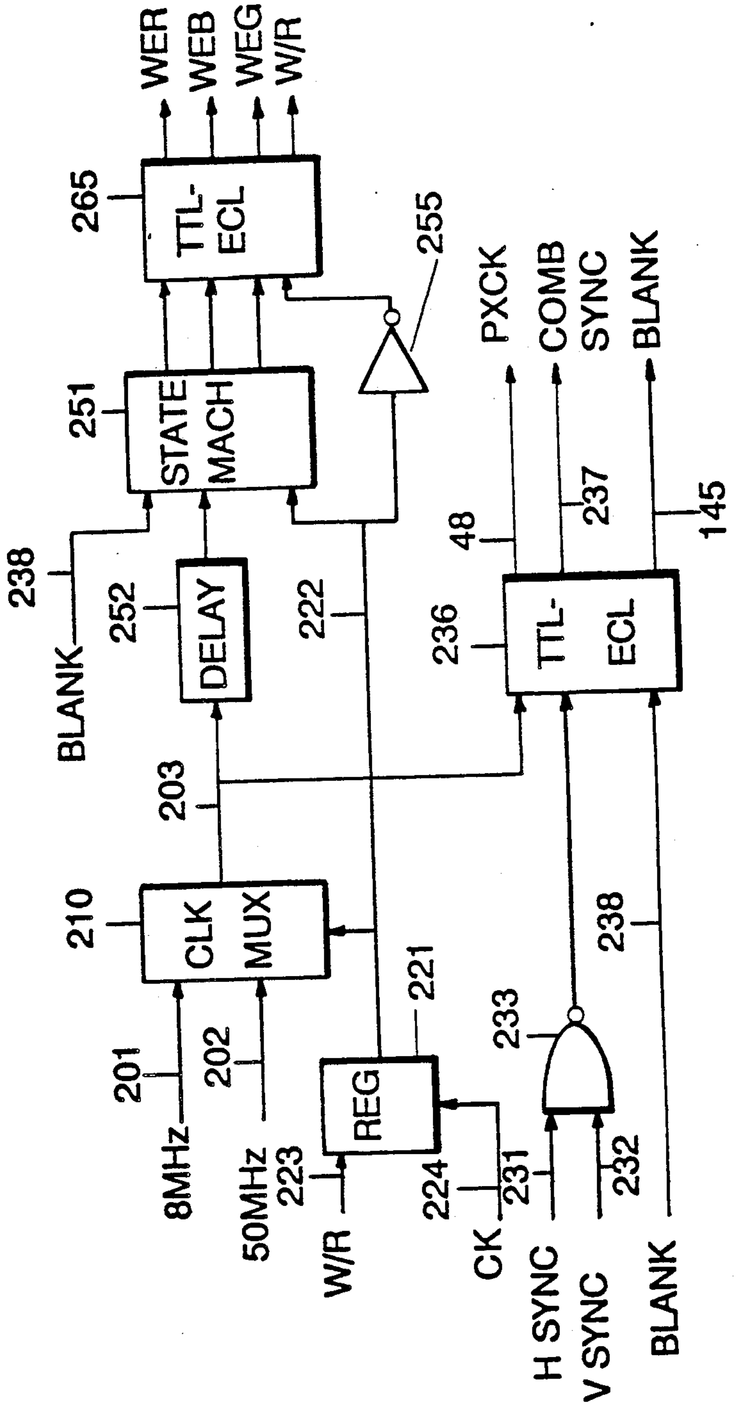
FIG. 3 shows timing and control circuitry for controlling the operation of the video signal processing circuitry of FIG. 2.

The timing and control circuitry for controlling the operation of the video signal processing circuitry of FIG. 2 is diagrammatically illustrated in FIG. 3 as comprising a control multiplexer 210 to which respective low rate 'write' clock (e.g. 8 MHz) and high rate 'read' clock (e.g. 50 MHz) input lines 201 and 202 are coupled. The 50 MHz 'read' clock is compatible with the scanning of a $1024\times1024$ video display having a 60 Hz vertical scan rate and a horizontal scan capability in the neighborhood of 32 KHz. (The horizontal scan rate may vary depending upon the retrace time of the display.) Under control of the contents of a control register 221, via a link 222, multiplexer 210 couples one of its input clock signals to each of a plurality of output link 203, for application to downstream logic circuitry. Control register 221, which, in its simplest form, may comprise a flip-flop, is loaded with the contents of a data link 223 by way of a clock line 224. The state of its output line 222 determines whether the interface is in the write/program mode or the frame store read-out mode. During the write mode, clock multiplexer 210 couples the low rate (8 MHz) clock on link 201 to its outputs, while during the read-out mode, it outputs the high rate (50 MHz) clock.

Respective horizontal and vertical sync signals on lines 231 and 232 from the frame store are combined in NAND gate 233 to produce a combined sync signal. The combined sync signal is (TTL-ECL) level-shifted by level shift circuit 236 and coupled over line 237 to input port 144 of digital-analog converter 140 (via 'green' look-up table memory 43) in FIG. 2. Level shift circuit 236 also provides level shifting of the blank signal on line 238 from the frame store and couples that signal over line 145 to digital-analog converter 140. In addition, it couples pixel clock signals PCLK on link 203 to control link 48 for application to look-up table memories 41, 42 and 43.

The generation of write enable signals for controlling the loading of the look-up table memories is effected by means of a state machine 251, preferably implemented in programmable array logic (PAL). State machine receives as inputs the blank signal on line 238, the output of control register 221 on line 222 and the clock output of clock multiplexer 210 on line 203, via delay circuit 252. Delay circuit 252 provides a delay that effectively centers the write enable signals with the color data pulses to be stored. Respective write enable signals WER, WEB and WEG are coupled from state machine 251 through (TTL-ECL) level shift circuit 265 over lines 45, 46 and 47 for application to look-up table memories 41, 42 and 43. The contents of control register 221, which represent whether the interface is in the write or read mode, are inverted via inverter 255, then level shifted through circuit 265 and coupled over control link 48 to each of look-up table memories 41, 42 and 43.

Figure 4:
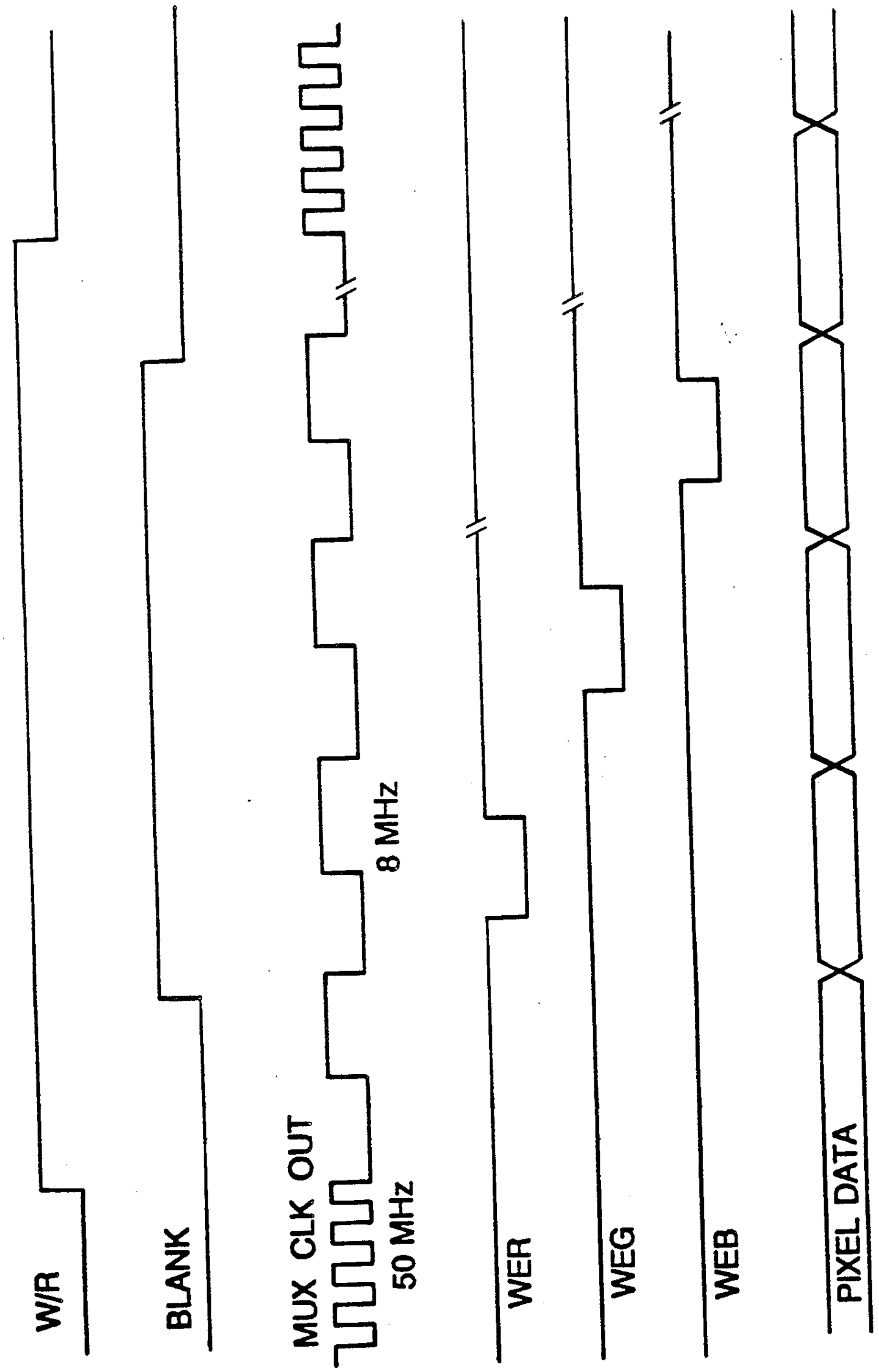
FIG. 4 is a timing diagram associated with the operation of the interface of FIGS. 2 and 3.

Operation of the interface may be understood by referring to the timing diagram shown in FIG. 4. Before the interface is utilized to controllably couple video image data from the frame store to the display device, look-up table memories 41, 42 and 43 are loaded with color correction or modification codes, through which the components of an image that has been placed in the frame store may be enhanced, modified or otherwise controllably adjusted, so as to tailor the stored image in accordance with a prescribed color translation operator. The parameters upon which the color conversion mechanism is based and the algorithm itself are not germane to the present invention and will not be described here. Instead, the description to follow will detail the manner in which the system stores and then controllably accesses whatever color conversion operator is to be employed to provide the requisite color correction for each of the pixels of the output color display device.

Loading of the look-up table memories is initiated by placing the system in the 'write' mode. For this purpose, a prescribed logic bit (e.g a logical "1") is written into control register 221. This change in state of the contents of register 221 is denoted in FIG. 4 by output line 222 transitioning to a 'write' state at time t0. This 'write' state on line 222, in turn, causes clock multiplexer 210 to change the frequency of its output clock on line 203 from the 50 MHz fast clock to the 8 MHz slow clock. At some time t1 after the system has been placed in the 'write' mode, the blank level on line 238 is de-asserted by the frame store, whereupon state machine 251 begins repetitively generating write enable (WE) pulses WER, WEB and WEG, which are coupled over lines 45, 46 and 47 to look-up table memories 41, 42 and 43, respectively. For each address code coupled over address links 71, 72 and 73, a corresponding color correction is placed on data link 75, in the color cycle sequence, and thereby successively loaded into the look-up table memories. This process continues until each of the 256 memory locations in each of look-up up table memories 41–43 have been addressed. As pointed out previously, during the loading sequence, the 8 MHz clock on line 203 is delayed (via delay circuit 252), so that the write enable pulses output by state machine 251 will be centered with the data being loaded via link 75. Once the last byte of data has been written into 'blue' look-up table 42, the blank level on line 238 is asserted at time t2, prior to the next clock cycle, so as to terminate the write mode.

With the color correction codes stored in the look-up table memories, read-out of color video data in the frame store proceeds by placing the system in the 'read' mode. For this purpose, the logic state of the contents of control register is changed to a "0" bit (shown at time t4 in FIG. 4), so that output line 222 goes low and inhibits state machine 251 from producing write enable signals. The change in state of line 222 also causes clock multiplexer 210 to couple the high rate (50 MHz) clock over line 203, so that the pixel clock is compatible with the scanning rate of the color display. As pixel data is read out from the frame store over lines 71, 72 and 73 it is coupled as address inputs to the look-up table memories, the contents of which are correspondingly read out over output links 101, 102 and 103 for application to digital-analog converter 140, from which pixel excitation signals are produced. During normal color mode operation, 'red' and 'blue' data is coupled to digital-analog converter 140 through multiplexers 121 and 122, respectively. As a result, for each pixel of the $1024\times1024$ array, a total of 24 bits of color (correction) information are coupled from the frame store to the digital-analog converter for the generation of pixel excitation signals, so that the full sixteen million color range of the video color image is available. There is no loss of color quality by compression and display through the host processor and its attendant color monitor. For a monochromatic (green) mode display, the green code data line 103 is coupled through each of the multiplexers, so that all of the inputs of the digital-analog converter receive the green data.

As will be appreciated from the foregoing description, the quality reduction characteristics of conventional frame store data processing systems are obviated by a frame store interface through which the imagery data may be read out to a high resolution color monitor, without the need for traversing the typical path through the host computer's signal processing communication link. As a consequence, the color range capacity of the imagery data is not detrimentally impacted. In addition, by means of a set of color-dedicated look-up tables, the contents of which are addressed by the imagery data accessed from the frame store, precision enhancement or correction of each of the available color of which each pixel in the regenerated image may be comprised is afforded. Since the excitation voltage for driving each pixel of the output color display is derived in accordance with three, eight bit color correction codes, the full color range (sixteen million plus colors) storage capability of the frame store is utilized.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. For use with a digital video data memory containing JxNxMx, K-bit digital codes, each K-bit code being associated with one of a plurality of J colors that are used to define the color contents of an NxM array of image components into which a color image has been subdivided, an apparatus for controllably generating pixel energization signals for application to a color display device having an NxM array of pixels, whereby said color image may be displayed by said color display device, comprising;

a plurality J of look-up table memories, each of which is capable of storing plural, K-bit, color correction codes representative of color correction values associated with one of said J colors;

first means, coupled to said plurality J of look-up table memories, for writing into each look-up table memory plural, K-bit, color correction codes;

second means, coupled to said plurality J of look-up table memories, for coupling, from said digital video data memory, to each respective look-up table memory, NxM, K-bit digital codes for a respective one of said J colors and accessing therefrom NxM, K-bit color correction codes, each of which accessed color correction code is associated with a respective one of the NxM pixels of said display device and wherein said second means further indludes means, coupled to said digital video data memory, for controllably coupling the NxM, K-bit digital codes, supplied therefrom, for a monochromatic mode of operation of said apparatus, to said third means, whereby said third means converts each of the NxM, K-bit digital codes coupled thereto by said second means into a respective pixel energization signal for controlling the excitation of one of the pixels of said NxM pixel array of said display device, so that upon controlling the excitation of the NxM pixels of said display device with NxM pixel energization signals converted by said third means, said display device displays said image in a monochromatic format; and third means, coupled to said second means, for converting each of the NxM, K-bit color correction codes accessed by said second means from a respective one of said J look-up table memories into a respective pixel energization signal for controlling the excitation of one of the pixels of said NxM pixel array of said display device;

whereby, upon controlling the excitation of the NxM pixels of said display device with NxMxJ pixel energization signals converted by said third means, said display device displays said color image in a color-corrected format.

2. In a data processing system having a host processor and attendant color display monitor, said host processor being coupled to a communication link to which a digital video frame store is coupled, said frame store storing JxNxM, K-bit digital codes, each of which is associated with one of a plurality of J colors that are used to define the color contents of an NxM array of image components of a color image derived from a color video source, the improvement comprising an interface coupled directly between said frame store and a color display device, exclusive of said attendant color monitor, said color display device having an array of NxM color pixels, said interface comprising:

first means for controllably accessing from said frame store JxK-bit digital codes for each of NxM pixels of said color display device said first means includes means, coupled to said frame store, for controllably coupling NxM, K-bit digital codes, supplied therefrom, for a monochromatic mode of operation of said apparatus, to said converting means, whereby said converting means converts each NxM, K-bit digital code into a respective pixel energization signal for controlling the excitation of one of the pixels of said NxM pixel array of said display device, so that said display device displays said image in a monochromatic format; and second means comprising:

a plurality J of look-up table memories, each of which is capable of storing plural, K-bit, color correction codes representative of color correction values associated with one of said J colors;

means, coupled to said plurality J of look-up table memories, for writing into each look-up table memory plural, K-bit, color correction codes;

means coupled to said first means and said plurality J of look-up table memories, for coupling to said look-up table memories from said frame store, NxM, K-bit digital codes accessed by said first means, to derive NxM, JxK bit color correction codes, each of which is associated with a respective one of the NxM pixels of said display device; and means, for converting each of the NxM, K-bit color correction codes accessed from a respective one of said J look-up table memories into a respective pixel energization signal for controlling the excitation of one of the pixels of said NxM pixel array of said display.

3. An apparatus according to claim 1, wherein said plurality of J colors corresponds to the three colors red, green and blue.

4. An apparatus according to claim 1, wherein each of said look-up table memories is capable of storing $2^K$ color correction codes.

5. An apparatus according to claim 1, wherein said first means includes means for successively addressing storage locations in said J look-up table memories during a write mode of operation of said apparatus at a first clock rate and storing therein respective ones of said color correction codes.

6. An apparatus according to claim 5, wherein said second means includes means for successively addressing, at a second clock rate faster than said first clock rate, during a read mode of operation of said apparatus, storage locations in said J look-up table memories, with NxM, K-bit digital codes supplied from said digital video data memory, and thereby accessing a total of NxM, JxK-bit color correction codes, each of which accessed color correction code is associated with a respective one of the NxM pixels of said display device.

7. The improvement according to claim 2, wherein said plurality of J colors corresponds to the three colors red, green and blue.

8. The improvement according to claim 2, wherein each of said look-up table memories is capable of storing $2^K$ color correction codes.

9. The improvement according to claim 2, wherein said writing means includes means for successively addressing storage locations in said J look-up table memories during a write mode of operation of said interface at a first clock rate and storing therein respective ones of said color correction codes.

10. The improvement according to claim 9, wherein said K-bit code coupling means includes means for successively addressing, at a second clock rate faster than said first clock rate, during a read mode of operation of said apparatus, storage locations in said J look-up table memories, with NxM, K-bit digital codes supplied from said frame store, and thereby accessing a total of NxM, JxK-bit color correction codes, each of which accessed color correction code is associated with a respective one of the NxM pixels of said display device.

* * * * *